United States Patent [19]

Cathenaut et al.

[11] Patent Number: 5,343,710
[45] Date of Patent: Sep. 6, 1994

[54] PREPARATION OF STRIPED LOLLY-TYPE CONFECTIONS

[75] Inventors: Philip I. Cathenaut, Beauvais, France; Friedrich Wendelin, Vallirana/Barcelona, Spain

[73] Assignee: Nestec S.A., Vevey, Switzerland

[21] Appl. No.: 70,637

[22] Filed: May 28, 1993

Related U.S. Application Data

[63] Continuation of Ser. No. 848,216, Mar. 10, 1992, abandoned.

[30] Foreign Application Priority Data

Mar. 30, 1991 [EP] European Pat. Off. ........ 91105129.0

[51] Int. Cl.$^5$ ............................................. A23G 9/14
[52] U.S. Cl. ........................................ 62/71; 62/345; 425/126.2; 426/91; 426/100; 426/249; 426/421; 426/515
[58] Field of Search ................ 62/345, 71; 426/68, 426/91, 100, 101, 249, 421, 515; 425/126.2, 134

[56] References Cited

U.S. PATENT DOCUMENTS

| | | | |
|---|---|---|---|
| 1,720,190 | 7/1929 | Van Horne | 426/91 X |
| 1,886,763 | 11/1932 | Trettin | 426/68 |
| 1,900,355 | 3/1933 | Maurer | 99/137 |
| 2,048,364 | 7/1936 | Willems | 99/137 |
| 2,123,215 | 7/1938 | Thomas | 107/54 |
| 2,176,408 | 10/1939 | Peterson | 99/137 |
| 2,176,409 | 10/1939 | Peterson | 107/54 |
| 2,288,970 | 7/1942 | Weisbender | 99/137 |
| 2,614,047 | 10/1952 | Turner | 99/137 |
| 2,747,525 | 5/1956 | Lund | 426/249 |
| 2,975,732 | 3/1961 | De Pasquale | 426/249 |
| 3,274,958 | 9/1966 | Otken | 107/54 |
| 4,546,615 | 10/1985 | Gram | 62/73 |
| 4,759,197 | 7/1988 | Franco et al. | 62/345 |
| 4,986,080 | 1/1991 | Grigoli et al. | 62/345 X |

FOREIGN PATENT DOCUMENTS 892051 3/1962 United Kingdom.

Primary Examiner—William E. Tapolcai
Attorney, Agent, or Firm—Vogt & O'Donnell

[57] ABSTRACT

Frozen ice products are prepared by freezing a first ice mixture in a first mold to form a core and then by freezing a second ice mixture about the core in a second mold. The core is prepared by introducing and freezing a first ice mixture in a mold having a grooved frustocylindrical hollowed interior which, after demolding, provides a frozen grooved ice article which is introduced as a core into a second mold having a frustocylindrical hollowed interior and which has been filled partly with a second ice mixture which is frozen. A striped product is produced by employing a second mold which has a hollow cross-section size not larger than the cross-section size of the hollow of the first mold so that the outer edge frozen core surfaces contact the second mold.

7 Claims, 3 Drawing Sheets

PREPARATION OF STRIPED LOLLY-TYPE CONFECTIONS

CROSS REFERENCE TO RELATED APPLICATION

This application is a continuing application of application Ser. No. 07/848,216, filed Mar. 10, 1992, now abandoned.

BACKGROUND OF THE INVENTION

This invention relates to a method and a machine for the production of a decorated article of ice confectionery of the ice lolly type (water ice, sorbet or two-flavoured ice cream).

Hereinafter, the generic term "ice" used on its own is understood to encompass the various compositions mentioned above.

In the field of articles bought on impulse, such as ice lollies, consumers are constantly seeking new shapes or new decorative patterns. Water ices in particular lend themselves to decoration with contrasting patterns of different colours by virtue of the fact that the absence of aeration, or the low degree of aeration of the mixture to be frozen provides the article with a surface of sparkling appearance.

An attractive pattern is formed by contrasting longitudinal stripes. To produce a pattern such as this, for example in accordance with U.S. Pat. No. 4,986,080, a frozen core is made from a first water ice mixture of one colour and of a first flavour by means of a first mould generally frustocylindrical in shape and formed with longitudinal grooves, for example in the form of a spiral as illustrated at the surface of the stick. The core thus formed is then introduced into a second mould having the same cross-section as the first mould, but without any grooves, the interstices between the core and the second mould are filled with a liquid water ice mixture of a second flavour and of another colour contrasting with the preceding colour, after which the mixture is frozen and the article is demoulded.

In practice of the method of the '080 patent, in view of the reduced dimensions of the lollies and the presence of the holding sticks, the second flavour is very difficult to introduce into the grooves without splashing. In addition, since the mixture cannot be exactly introduced into the interstices in practice, it is preferred to introduce an excess of liquid capable of filling the interstices by gravity so that, in the end products, the stripes are not vertically aligned. Finally, because the mixture introduced is liquid, it is able to penetrate between the wall of the second mould and the core which is not always exactly adapted to this mould, overflowing from the grooves in the form of a film which, after freezing of the article, produces a coating that spoils the cleanness of the contrasts.

The problem addressed by the present invention was to obviate the disadvantages of the prior art by providing a process and a machine for the production of decorated two-flavoured ice lollies of the above-mentioned type and of other types beyond the scope of the known process with cleanly contrasting stripes.

SUMMARY OF THE INVENTION

The process according to the invention is characterized in that the frozen core is produced in a first grooved frustocylindrical mould, after which the core is introduced as a countermould into a second frustocylindrical mould having the same cross-section as that in which the countermould fits, the second mould having been partly filled beforehand with ice mixture of the second flavour so that the countermould causes it to ascend into the recessed interstices to form stripes.

The second mould is preferably partly filled, for example to between $\frac{1}{4}$ and $\frac{3}{4}$ and preferably to between $\frac{1}{4}$ and $\frac{1}{3}$ of its volume, shortly after removal of the core.

The present invention also relates to a machine for the production of an article of two-flavoured ice confectionery of the decorated ice lolly-type comprising a freezing tank through which alternate lines of moulds of a first type A and a second type B pass two steps at a time, a filling station for the moulds A, a stick insertion station for the moulds A, a surface-heating station for the moulds A, a station for transferring the frozen cores from the moulds A to the moulds B, a station for partly filling the moulds B, a surface-heating station for the moulds B and a station for removal of the article, characterized in that the station for partly filling the moulds B is positioned between the withdrawal of the frozen cores and their introduction into the moulds B in the direction of travel of the moulds.

DETAILED DESCRIPTION OF THE INVENTION

In one preferred embodiment of the process according to the invention, the first mould has substantially the same length and the same conicity as the second mould and fits into a larger cross-section than that of the second mould, taking into account the loss of cross-section through melting on demoulding of the core. In this way, the core is able to descend exactly to the base of the second mould and can be applied to its inner wall without any play. Stripes are thus formed over the entire length of the lolly.

In another, but not preferred, embodiment, the core may have a slightly larger cross-section after demoulding than the second mould and may be slightly shorter than the second mould while retaining the same conicity. In this case, the core touches the inner wall of the second mould without descending completely to the base. This is not a significant disadvantage and, in this case, the end of the ice lolly will be in one colour without any stripes. In a variant of this embodiment, the core is shorter than second mould, but has the same cross-section. In this case, the core descends to the base of the second mould and is applied to its inner wall, but leaves a space at the top of the mould which may be filled with the second flavour. The position is thus reversed, i.e., a single-colour layer is present at the other end of the lolly near the stick.

In a variant of the process which leads to patterns with crossing stripes, the first mould is partly filled with the mixture of the first flavour which is then frozen, after which a layer of the mixture of the second flavour is introduced and frozen and filling of the first mould is completed with the mixture of the first flavour which is then also frozen after the insertion of a stick. This core may then be used as a countermould by introduction into a second mould partly filled beforehand with mixture of the second flavour.

After demoulding, the article may be iced over its surface by dipping in water or spraying with water so that it is given a sparkling appearance.

The invention is described in more detail with reference to the accompanying drawings.

DETAILED DESCRIPTION OF THE DRAWINGS

Figure 1:
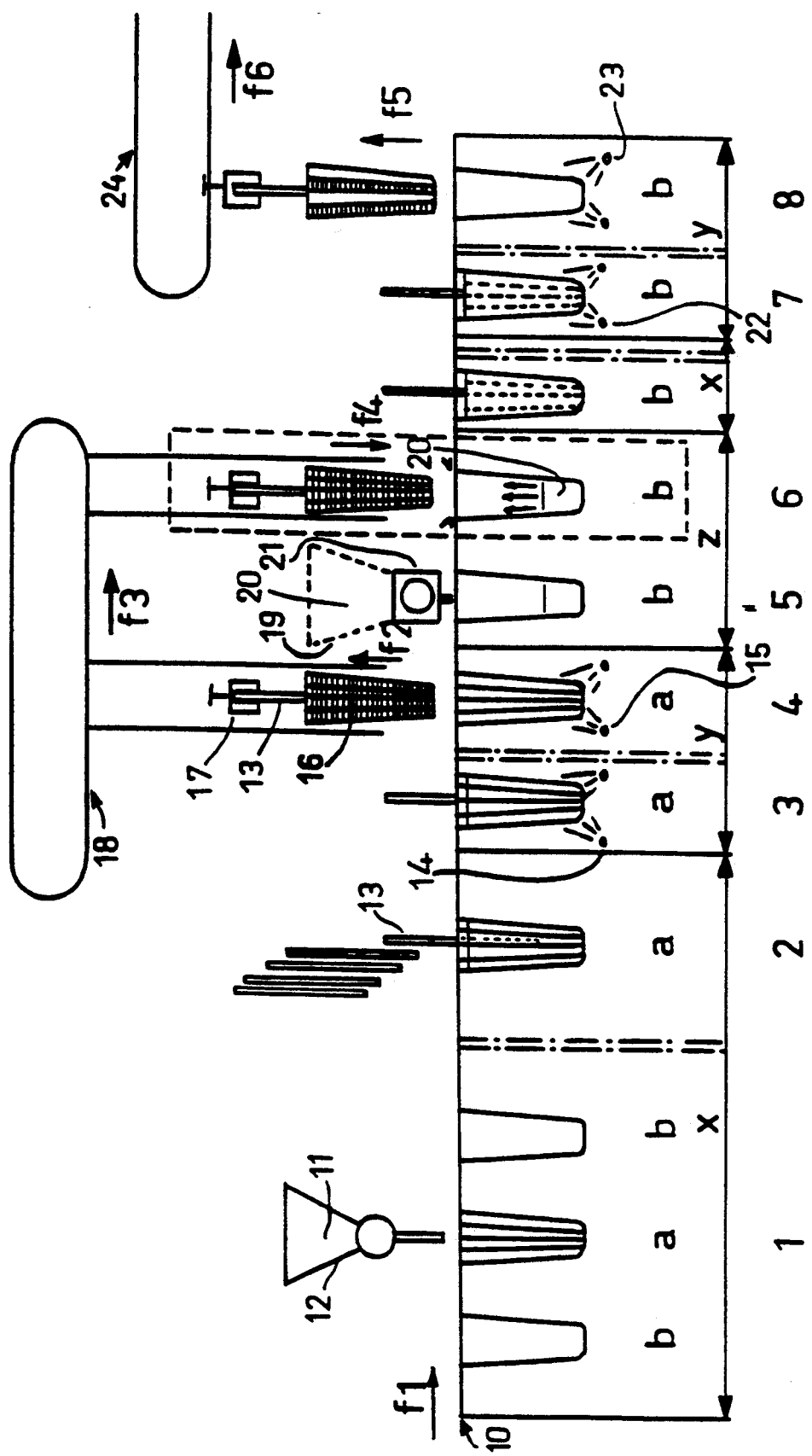
FIG. 1 is a diagrammatic illustration of the machine showing the various stations involved in the production of a striped lolly.

Referring to FIG. 1, the machine comprises freezing zones X, surface heating zones Y and an intermediate zone Z with no freezing or heating means, through which successive alternate lines of moulds A and B of different types pass from left to right in the direction of the arrow f1 by the intermittent two-step by two-step movement of the endless chain 10, a step in the present context representing the distance between two consecutive moulds.

Thus, a grooved frustocylindrical mould A arrives successively at stations 1 to 4. Similarly, a frustocylindrical mould B of the same conicity as, but slightly smaller in cross-section than, the mould A arrives successively at stations 5 to 8.

At station 1, a mould A is filled almost completely with an ice mixture 11 from the hopper 12. Under the effect of the freezing medium, the mixture begins to solidify, and a stick 13 is inserted therein at station 2.

As shown in FIG. 1, stations 1 and 2 are not separated by two steps, but by a larger even number of steps in view of the time taken by the mixture to acquire the necessary viscosity at 2 for the stick to be able to be introduced and to remain in position. At 3, the mould A has left the freezing zone to be surface-heated by jets 14 of hot water or brine. At 4, jets 15 of hot water or brine at the surface of the mould enable the core 16 to be demoulded. To this end, the core 16 is withdrawn vertically from the mould in the direction of the arrow f2 by its stick 13 by means of the clamp 17. The endless chain 18 then transports the core 16 horizontally in the direction of the arrow f3 until it is vertically in line with the station 6. At station 5, a second ice mixture 20 is introduced from the hopper 19 through the chamber 21 into the mould B situated below, the mould B being filled to between ¼ and ⅓ of its volume. The hopper 20 is shown in FIG. 1 in dotted lines to indicate that it is withdrawn in relation to the endless chain 18 so that it does not interfere with the transport of the core 16 from station 4 to station 6. The hopper 20 is connected to the chamber 21 by a flexible tube (not shown).

At stations 5 and 6, the mould B is situated in a non-freezing zone Z formed by cold ambient air. At 6, the core descends into the mould B which causes the mixture 20 to ascend into the empty parts of the grooves of the core, as will be explained in more detail hereinafter with reference to FIG. 2. The operations at stations 5 and 6 take place rapidly, i.e. in a few seconds. The mould B then moves into a zone X, in which complete solidification takes place, after which it enters a zone Y where it is surface-heated at station 7 by spraying with hot water or brine in the form of jets 22. At station 8, the lolly is withdrawn vertically from the mould B surface-heated by the jet 23 of hot water or brine in the direction of the arrow f5, and is then removed by the endless chain 24 in the direction of the arrow f6.

Thus, as described above, a first ice mixture is frozen in a first set of molds having grooved hollow frustocylindrical interiors to obtain a molded frozen cores having outer edge surfaces which define grooves therebetween. A second set of molds are filled partly with a second ice mixture and are transported to the transfer station. The cores are demolded and removed from the first set of molds and are transported at the transport station for insertion into the partly filled second set of molds so that the outer edge surfaces of the frozen cores contact the second molds which have a hollowed interior frustocylindrical in shape and a cross-section size not larger than a cross-section size of the hollow of the first mold.

The lolly may then be dipped in cold water in order to glaze its surface, for example in a tank normally used for applying a chocolate coating, and may then be wrapped, for example in a flow-pack wrapper, these operations not being shown.

Figure 2:
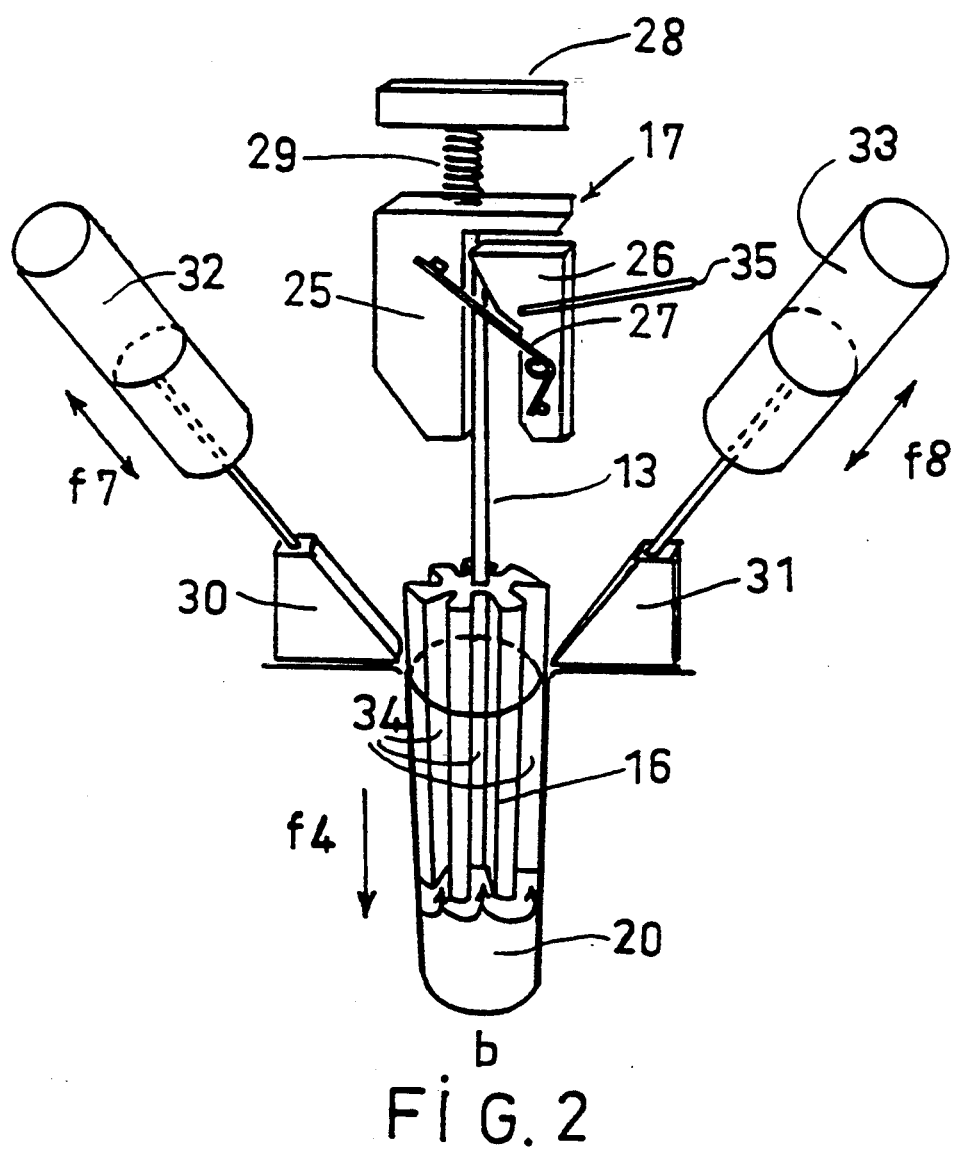
FIG. 2 is a detailed view of station 6 in FIG. 1 where the core is introduced into the second mould.

Referring to FIG. 2, the grooved core 16 descends into the mould B in the direction of the arrow f4 by means of the stick 13 gripped between the jaws 25 and 26 of the clamp 17 which are held against one another by the spring 27. The clamp 17 is mounted elastically on the bar 28 by means of the spring 29. The bar 28 is connected to a lifting and lowering system (not shown). The shape of the jaw 26 of the clamp 17 is such that, during withdrawal, for example at stations 4 and 8 in FIG. 1, the clamp 17 descends to take up a stick 13 which is held between the jaws 25 and 26 and is only able to slide in one direction, namely upwards.

In one embodiment (not shown) the clamp 17 does not have a bar 28 or a spring 29 or a stop. Instead the spring 27 is strong enough for the core to be able to descend to the base of the mould. Thus, if the core 16 jams during its introduction into the mould B at station 6, the clamp enables the stick to slide upwards.

In the variant illustrated, the spring 29, in cooperation with the stop of the jaw 25, enables the core to be introduced without play to the base of the mould at the end of its travel. The guide blocks 30 and 31 placed in position by the jacks 32 and 33 in the direction of the arrows f7 and f8 hold the mould B in position during its stop at station 6 despite the vibrations to which the chain 10 is subjected between two step-by-step movements. The jacks 32 and 33 lift the blocks obliquely to release the mould B after the core has been introduced. In a variant (not shown), there is no jack 32 because, in contrast to the guide 31 which has to be lifted for the passage of the stick moving beyond the mould, the guide 30 can remain in place.

In addition, the shape of the blocks provides for correct centering of the core in the mould B. As the core 16 descends into the mould B, the more or less liquid ice mixture 20 ascends into the grooves 34. The grooved core 16 fits with a minimum of play into the cross-section of the mould B because, as mentioned above, the loss of cross-section of the core by surface melting is compensated by the larger cross-section of the grooved mould of which the radius is larger than that of the mould B, for example by 1 to 2 mm.

The clamp 17 comprises a small lever 35 fixed to the jaw 26 which enables the stick 13 to be released by acting on the spring 27 after the core has been introduced.

Figure 3:
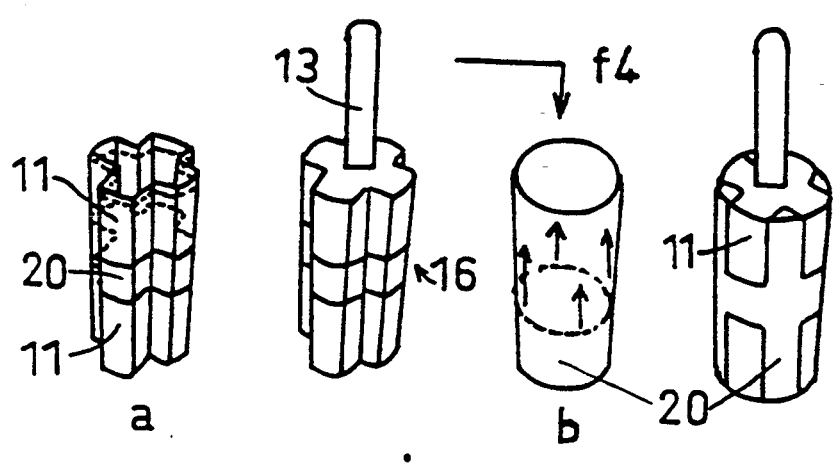
FIG. 3 diagrammatically illustrates the production of a lolly with a cross pattern.

Referring to FIG. 3, the mould A of cruciform cross-section is successively filled with ice mixture 11, which is frozen, with ice mixture 20, which is frozen and, finally, with ice mixture 11 through metering units (not shown). A stick 13 is placed in the three-layer core 16 thus formed, after which the core 16 is demoulded and introduced into the mould B which has been filled to approximately ¼ to ⅓ of its volume with ice mixture 20. After freezing of the mixture 20, the lolly is demoulded and then treated as described above.

Figure 4:
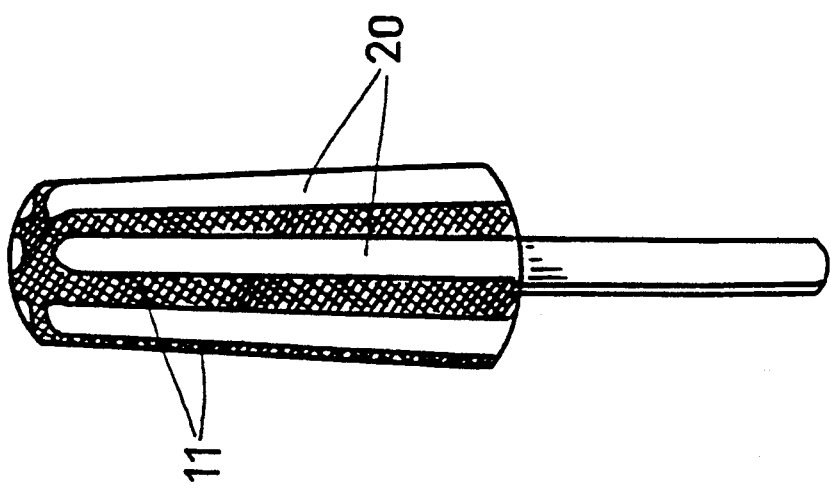
FIG. 4 shows a striped stick ice obtained with the machine illustrated in FIG. 1.

The lolly shown in FIG. 4 has alternate red stripes 11 of strawberry-flavoured water ice and white stripes 20 of lemon-flavoured water ice.

Figure 5:
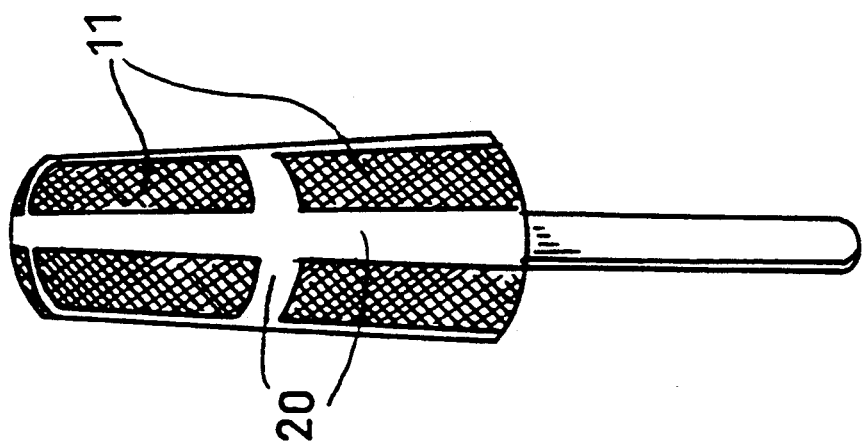
FIG. 5 shows a stick ice with a cross pattern obtained as illustrated in FIG. 3.

The lolly shown in FIG. 5 has a cross pattern consisting of red stripes 11 of strawberry-flavoured ice and white stripes 20 of lemon-flavoured ice.

The process according to the invention may be carried out under optimal conditions by using a low freezing temperature in the zones X, for example in the range from $-30°$ to $-40°$ C., relatively cold heating water or brine, for example at a temperature of 15° to 20° C., in the zones Y and by introduction of the ice mixtures at the lowest possible temperature compatible with introduction, for example 4° to 6° C., the zone Z being formed merely by relatively cold ambient air, for example at 14° to 15° C., due to the proximity of the freezing zones for a rate of advance of the chain of 15 to 25 strokes per minute (i.e., two steps per stroke). In this way, demoulding losses are minimized and the freezing time is shortened.

The foregoing description has been based on a linear machine. The production of lollies in accordance with the invention could, of course, also be carried out in a carousel-type machine provided with the various stations described above.

We claim:

1. A process for preparation of a frozen ice product comprising:

freezing a first ice mixture in a first mold having a grooved hollow frustocylindrical molding interior to obtain a molded frozen core having outer edge surfaces which define grooves therebetween;

partly filling a second mold with a second ice mixture, wherein the second mold has a frustocylindrical hollow molding interior and wherein the hollowed interior of the second mold has a cross-section size not larger than a cross-section size of the hollow of the first mold;

demolding and removing the frozen core from the mold and introducing the first frozen core into the second mold and second ice mixture so that the outer edge surfaces of the frozen core contact the second mold;

freezing the second ice mixture to obtain a frozen ice product; and demolding the frozen ice product.

2. A process according to claim 1 wherein a conicity of the first and second molds is substantially the same and wherein the first mold has a larger cross-section so that after demolding and removing the frozen core, the outer edge surfaces of the core, upon being introduced into the second mold, contact the second mold.

3. A process according to claim 1 or 2 further comprising first partly filling the first mold with the first ice mixture and freezing the mixture, partly filling the first mold with the second ice mixture and freezing the second ice mixture, and then filling the first mold with further first ice mixture and freezing the further first ice mixture to form the core and then demolding and removing the frozen core from the mold.

4. A process according to claim 1 or 2 further comprising glazing the demolded frozen ice with water.

5. A process according to claim 3 further comprising glazing the demolded frozen ice with water.

6. A process according to claim 1 wherein the first mold is shorter than the second mold.

7. In an apparatus for preparing a frozen ice product having one set of molds having a frustocylindrical grooved hollow interior for being transported for forming and providing frozen ice grooved cores, a second set of molds having a frustocylindrical hollow interior for being transported for receiving the cores and an ice mixture, freezing zones for freezing ice mixtures contained in the molds, at least two filling stations for introducing ice mixtures into the molds for freezing, a stick insertion station positioned to insert sticks into ice mixtures in the first set of molds, mold surface heating and demolding stations for removing cores and ice products from the sets of molds, and a transfer station for transferring frozen cores from the first set of molds to the second set of molds, the improvements comprising:

a filling station for introducing an ice mixture into empty molds of the second set to partly fill the molds of the second set, the filling station and transfer station being positioned so that the transfer station transfers frozen cores for insertion in the partly filled second set of molds.

* * * * *